United States Patent [19]
True

[11] 3,721,259
[45] March 20, 1973

[54] APPARATUS FOR REMOVING FLUIDS FROM FLUID SUPPLY PIPES

[76] Inventor: Cecil Wayne True, 825 South Maple St., Watertown, S. Dak.

[22] Filed: Sept. 9, 1971

[21] Appl. No.: 179,107

[52] U.S. Cl. .................137/270, 251/128, 251/291, 251/339, 222/321
[51] Int. Cl..............................................F16k 1/00
[58] Field of Search ......137/270, 327, 328; 251/100, 251/128, 291, 292, 339, 349; 222/321

[56] References Cited

UNITED STATES PATENTS

| | | | |
|---|---|---|---|
| 1,108,009 | 8/1914 | Seiss et al. | 137/270 X |
| 1,385,307 | 7/1921 | Condon | 222/321 |
| 2,038,778 | 4/1936 | Williams | 222/321 UX |
| 2,116,770 | 5/1938 | Scillia | 137/328 X |

Primary Examiner—Henry T. Klinksiek
Assistant Examiner—Robert J. Miller
Attorney—La Valle D. Ptak

[57] ABSTRACT

A rigid, hollow pipe having an external diameter which is smaller than the diameter of a riser pipe is provided with a resilient washer near one end; so that upon insertion of that end of the hollow pipe into the riser pipe, the washer compresses liquid in the riser pipe and forces it up through the hollow pipe where it is discharged from an opening at the other end thereof. The hollow pipe also is used to insert and operate a valve closing member at the bottom of the riser pipe.

14 Claims, 9 Drawing Figures

PATENTED MAR 20 1973 3,721,259

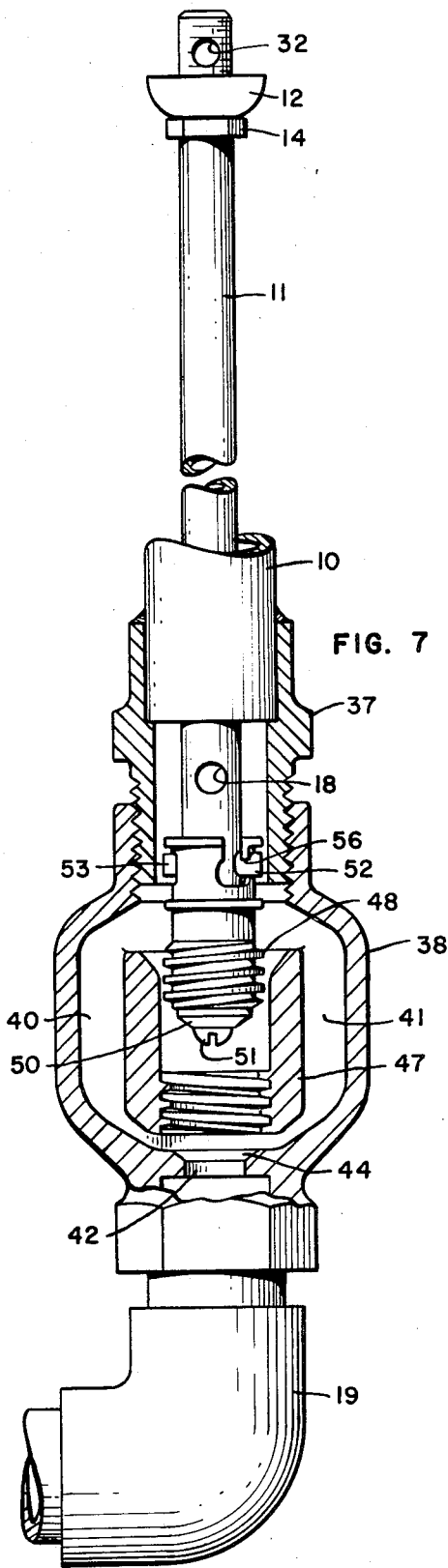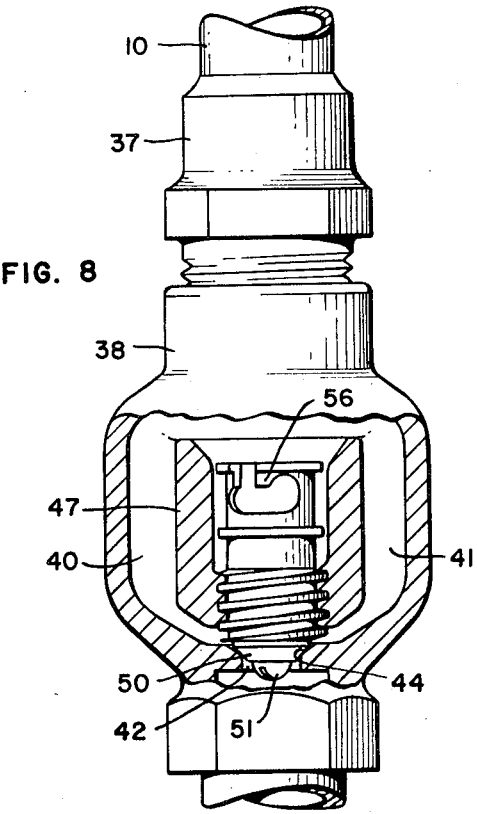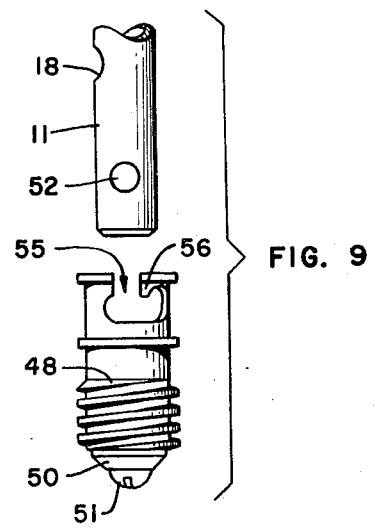
FIG. 7
FIG. 8
FIG. 9

APPARATUS FOR REMOVING FLUIDS FROM FLUID SUPPLY PIPES

BACKGROUND OF THE INVENTION

Liquid supply systems have been devised for preventing the riser pipes for supplying water or other liquids from freezing when these pipes pass vertically from an underground source through ground subjected to sub-freezing temperatures. Such systems often include electrical heating units which provide adequate protection for the riser pipes so long as electrical power is applied to the heating unit in sub-freezing weather. Even when no utilization is to be made of the water available, however, it still is necessary to provide such units with electrical power to prevent the possibility of water standing in the riser pipe from freezing and bursting the pipe causing expensive repairs. In mobile home courts when the particular space served by the water supply system is vacant, or in a summer cottage left vacant over the winter months, it is desirable to be able to turn off the electrical power to the heating unit to avoid the expense of providing protection for a riser pipe when no utilization is being made of the water supplied thereby.

To permit draining of the water from the riser pipe during periods of non-use, it has been the practice in the past to provide a valve below ground between the riser pipe and the underground water source for shutting off the source and allowing the water in the riser pipe to drain off into the ground. Thus, when the riser pipe is empty, there no longer is any danger of freezing and the electrical power to the protective heating unit may be turned off when the apparatus is not in use. This arrangement creates a problem, however, since it is possible for contaminants in the ground at the valve opening to enter the riser pipe when the valve is open to allow the riser pipe to drain. As a result, when water subsequently is supplied through the riser pipe to the user, it may be contaminated and unfit for consumption.

SUMMARY OF THE INVENTION

Accordingly, it is an object of this invention to provide improved apparatus for removing liquids from a supply pipe.

It is another object of this invention to remove the liquid from a liquid supply pipe in a manner minimizing possible contamination.

It is an additional object of this invention to provide apparatus for removing liquid from a liquid supply pipe and for thereafter closing said liquid supply pipe until utilization thereof subsequently is desired.

In accordance with the preferred embodiment of this invention, a liquid supply pipe is provided for connection between a source of liquid supply and a utilization point. To remove liquids from the supply pipe a hollow pipe is provided having an external diameter which is less than the internal diameter of the liquid supply pipe and having an internal diameter which is substantially less than the internal diameter of the supply pipe. The hollow pipe has openings at each end thereof, and a compression washer is mounted on the hollow pipe near one end between the openings. The external diameter of the compression washer is sufficient to snugly engage the internal surface of the riser pipe when the end of the hollow pipe carrying the washer is inserted into the supply pipe. Such insertion forces any liquid which may be in the supply pipe through the opening in the end of the hollow pipe inserted into the supply pipe. The liquid is discharged from the opening at the other end of the hollow pipe, thereby evacuating the liquid from the supply pipe. The hollow pipe also includes apparatus for carrying and operating a supply pipe closing device which may be in the form of an expandable plug or a valve operating member placed into the supply pipe at a position near the supply point for plugging or blocking the supply pipe.

BRIEF DESCRIPTION OF THE DRAWING

FIG. 7 is a partially cut-away view of another embodiment of the invention; and

FIGS. 8 and 9 show details of a portion of the apparatus shown in FIG. 7.

DETAILED DESCRIPTION

Figure 1:
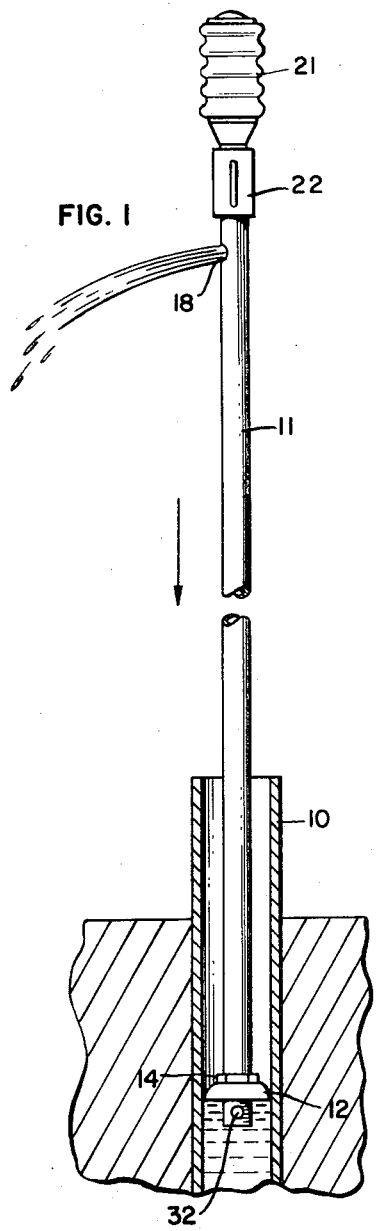
FIGS. 1, 2 and 3 illustrate one embodiment of the invention.
Figure 2:
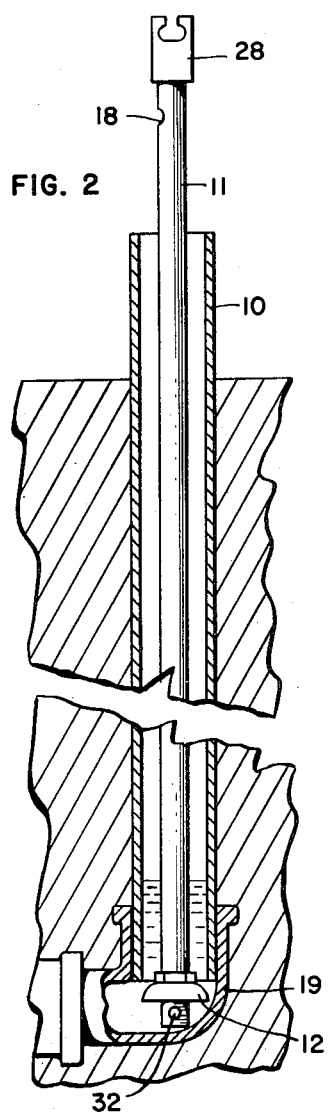
Figure 3:
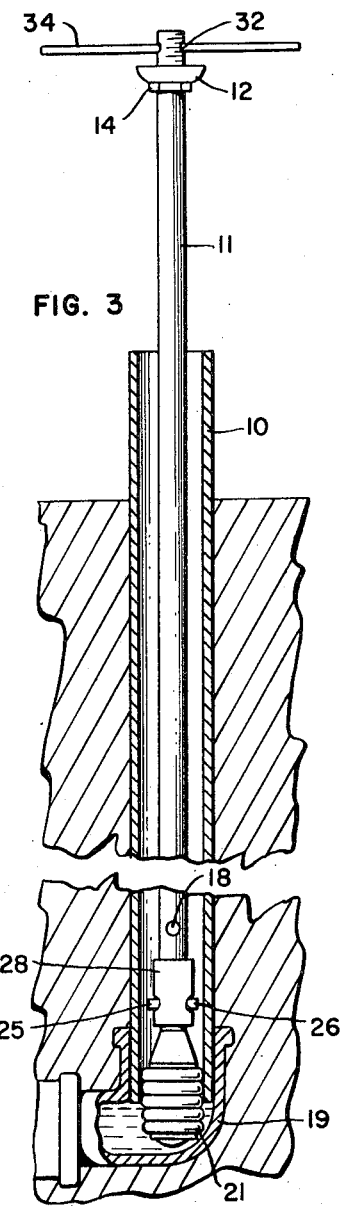
Figure 4:
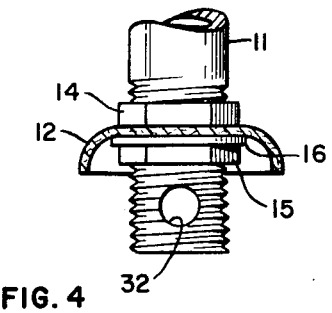
FIG. 4 shows a detail of a portion of the apparatus shown in FIGS. 1, 2 and 3.
Figure 5:
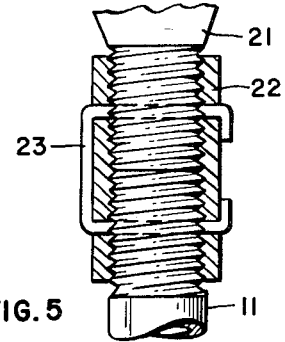
FIG. 5 shows a detail of the apparatus shown in FIG. 1.

Referring now to the drawings, wherein like reference numbers are used throughout the several figures to designate the same or similar components, there is shown in FIGS. 1, 2 and 3 a fluid supply pipe which preferably is a riser pipe 10 for supplying water from an underground source to an above ground utilization point (not shown), such as a mobile home, stock tank waterer, summer cabin, or the like. When no use is to be made of the water supplied by the pipe 10 at the utilization point during sub-freezing weather, it is desirable to evacuate the water from the pipe 10 by some means other than a drain back below ground. This is effected by first turning off the main water supply (at a point not shown in the drawing). A rigid hollow pipe 11 then is inserted into the supply pipe 10, as shown in FIG. 1. The outside diameter of the pipe 11 is smaller than the inside diameter of the supply pipe 10 and the inside diameter of the pipe 11 is substantially smaller than the inside diameter of the supply pipe 10. The lower end of the pipe 11 (as shown in FIG. 1) is open and has a cup-shaped washer 12 secured near the lower open end. As seen most clearly in FIG. 4, the lower end of the pipe 11 is externally threaded; and the washer 12 is secured to the pipe 11 by means of a pair of nuts 14 and 15 and a washer 16. Preferably, the washer 12 is made of a resilient material, such as leather or the like, which will conform to minor irregularities on the internal surface of the supply pipe 10.

When the hollow pipe 11 is inserted into the open or utilization end of the supply pipe 10 and pushed downwardly as indicated in FIG. 1, the washer 12 fits snugly against the inside of the pipe 10 and causes compression of any water located below the washer 12 as viewed in FIG. 1. The pressure caused by moving the pipe 11 downwardly forces the water in the pipe 10 upwardly through the open bottom end of the pipe 11, and the water is discharged through an opening 18 in the side of the pipe 11 as shown in FIG. 1. The discharge could be through the top of the pipe 11; but in the event that the pipe 10 is vertical, a discharge directly out of the top of the pipe 11 would permit much of the water to fall back down along the outside of the pipe 11 and into the open end of the pipe 10. Thus, it is preferable to have an opening 18 in the side of the pipe 11 near its upper end and to close the upper end of the pipe 11; so that the discharge of the water is to the side, preventing it from falling back into the pipe 10.

The riser pipe 10 normally is connected to the source of underground supply by an elbow 19 or the like; and when the end of the hollow pipe 11 carrying the washer 12 is fully inserted into the riser pipe 10, it is possible for the washer 12 to enter the elbow (as shown in FIG. 2), with a small amount of water remaining above the washer 12. This water, however, is well below the freezing line to which the riser pipe 10 is subjected; and subsequent removal of the hollow pipe 11 by pulling it vertically from the position shown in FIG. 2 out of the pipe 10 will cause the washer 12 to lift out most of the water shown above it in FIG. 2. Even if a small amount of water does remain near the bottom of the pipe 10, this water is below the freezing line and is of no consequence.

After removal of the water from the riser pipe 10 in the manner described above, it is desirable to block or close the lower end of the riser pipe 10 to prevent the water in the main water supply pipe attached to the elbow 19 from reentering or filling the riser pipe 10. One device for accomplishing this is shown in FIGS. 1, 3, 5 and 6 and in FIG. 1 constitutes an expandable plug 21 attached to the closed upper end of the hollow pipe 11 by means of a threaded collar 22 and locking pin 23 (best shown in FIG. 5). After the water has been removed from the pipe 10, the pipe 11 shown in FIG. 1 is turned over; and the end carrying the expandable plug 21 is inserted into the supply pipe 10 to place the plug 21 at the bottom of the supply pipe 10.

Rotation of the pipe 11 in a direction to cause the expandable plug ends to be drawn closer to one another expands the sides of the plug in a manner shown in FIG. 3 to cause it to fit snugly into the bottom of the supply pipe 10. The plug 21 then prevents the reentry of water from the supply system coupled to the elbow 19 into the supply pipe 10 so long as the plug 21 remains in place as shown in FIG. 3. When it is desired to remove the plug 21, the hollow pipe 18 is rotated in a direction opposite to that which tightens the plug 21, effecting its release. The pipe 11 then is withdrawn from the pipe 10, and the water supply system can be reconnected and used in its normal manner.

Figure 6:
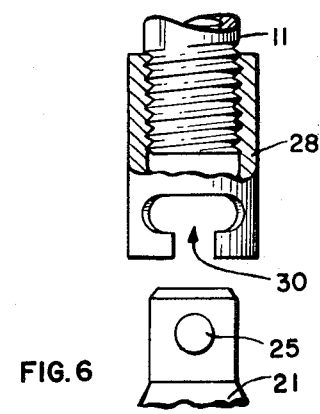
FIG. 6 shows a detail of the portion of the apparatus shown in FIGS. 2 and 3.

If it is not desired to leave the pipe 11 in place in the supply pipe 10 for the duration of time that the plug 21 is in place, the plug 21 can be employed as a separate unit as shown in FIGS. 3 and 6. The same type of plug is used; but instead of permanently attaching it to the end of the pipe 11, the plug 21 is provided with a pair of diametrically opposite pins 25 on the upper shank portion. The pins extend outwardly from the shank of the plug 21 at a distance which is less than the inside diameter of the pipe 10. The end of the pipe 11 which is remote from the washer 12 is threaded, and a pin engaging member 28 is secured to it, as best shown in FIG. 6.

The pin engaging member 28 is a short, hollow pipe having an internal diameter which is large enough to accommodate the upper end or upper shaft of the expandable plug 21. Opposite sides of the open end of the member 28 are provided with T-shaped slots which are wide enough to encompass the outside diameter of the pin members 25. With the member 28 aligned with the pins 25 as shown in FIG. 6, the pipe 11 can be moved downwardly, as viewed in FIG. 6, to place the pins 25 and 26 within the T-shaped slots 30. Thereafter, rotation of the pipe 11 in either direction causes the pins 25 and 26 to engage the ends of the horizontal bars of the T-shaped slots 30; so that the upper end of the expandable plug 21 can be rotated in either direction by rotation of the pipe 11 as shown in FIG. 3.

With the pins 25 and 26 located at either end of the horizontal bar of the T-shaped slots it also is possible to raise and lower the expandable plug 21 by means of the hollow pipe 11. After the expandable plug 21 has been put in place by lowering it with the hollow pipe 11, it can be tightened by rotating the pipe 11 in the manner described previously. After the plug 21 is tightened, the pipe 11 is rotated a small amount in the opposite direction until the pins 25 and 26 are in alignment with the vertical portions of the T-shaped slots 30, whereupon withdrawal of the hollow pipe 11 can be effected, leaving the expandable plug 21 in place. Reversal of the procedure is effected to remove the expandable plug 21 when that is desired.

To facilitate the rotation of the pipe 11 to either tighten or loosen the expandable plug 21, a hole 32 is formed through the end of the pipe 11 near the washer 12. A key in the form of a rod 34 (FIG. 3) may be inserted through the hole 32 and used as a handle for rotating the hollow pipe 11. The hole 32 may be made large enough to permit the insertion of a small screwdriver or the like to be used as a handle for rotating the hollow pipe 11.

Referring now to FIGS. 7, 8 and 9, there is shown another embodiment of the apparatus using a valve at the lower end of the riser pipe 10 to couple the riser pipe 10 to the elbow 19. The riser pipe 10 preferably is made of stainless steel tubing, since the internal diameter of stainless steel tubing is relatively uniform. This permits the most efficient use of the hollow pipe 11 and resilient washer 12 to remove the water from the riser pipe 10. Galvanized pipe is subject to fairly wide variations of inside diameter, which causes a reduction in the efficiency of the water removal.

When stainless steel tubing is used for the riser pipe 10, a coupler 37 is brazed to the lower end of the riser pipe 10 and is externally threaded to provide a mounting for a valve body 38, which may be of a conventional type. The lower end of the valve body shown in FIG. 7 is attached to the elbow 19 in a conventional manner. The valve body 38 provides a pair of passages 40 and 41 on each side thereof, as shown in the cross-sections of FIGS. 7 and 8. These passages communicate with a lower opening 42 of the valve body and with the interior of the coupler 37 and the end of the riser pipe 10. A valve seat 44 is provided at the point where the passages 40 and 41 join the lower opening 42, and an internally threaded support structure 47 is provided directly above the valve seat 44 to accommodate a threaded valve poppet or operating member 48.

The lower end of the poppet 48 has a resilient gasket 50 secured thereto by a threaded fastener 51, and the gasket 50 corresponds to and conforms with the valve seat 44. Thus, when the poppet 48 is threaded tightly downward into the position shown in FIG. 8, the gasket 50 engages the valve seat 44, closing the valve 38 in a conventional manner. No fluid then can be supplied from the elbow 19 into the riser pipe 10.

During normal utilization of the water supply system of which the riser pipe 10 is a part, the poppet 48 either is threaded to an open position, permitting the water to flow through the passages 40 and 41 to the riser pipe 10, or is removed completely, permitting water to flow directly upwardly through the central part of the valve body 38 as well as the passage 40 and 41. After the main water supply to the elbow 19 has been turned off, the water can be removed from the riser pipe 10 in the manner described above in conjunction with the description of FIGS. 1 and 2, and the poppet 48 must be threaded into tight engagement with the valve seat 44. This can be done either before or after removal of the water.

The valve poppet 48 has a hollow upper portion of sufficient internal diameter to accommodate the end of the pipe 11 which is remote from the end carrying the washer 12. This is shown most clearly in FIGS. 7 and 9. A pair of generally L-shaped slots 55 are provided in the sides of this upper hollow portion of the poppet 48 and are of a width which is sufficient to accommodate a pair of engaging pins 52 and 53 mounted on diametrically opposite sides of the pipe 11 near its end.

The pipe 11 is inserted into the hollow end of the poppet 48 by bringing the pipe 11 and poppet 48 together in the relative positions shown in FIG. 9. When the pins 52 and 53 reach the bottom of the L-shaped slots 55, the pipe 11 is rotated toward the closed end of the horizontal portions of the slots opposite the elbows or bends; so that subsequent relative movement of the pipe 11 and poppet 48 in opposite vertical directions, as viewed in FIG. 9, causes the pins 52 and 53 to be held in an upwardly extending pocket formed by projections 56 formed in each of the slots 55. The manner in which the pins 52 and 53 are accommodated and confined by the projections 56 is best illustrated in FIG. 7. With the apparatus in the relative positions shown in FIG. 7, the poppet 48 may be inserted and withdrawn from the riser pipe 10 by insertion and withdrawal of the hollow pipe 11.

When the threaded portion of the poppet 48 is inserted to the point where it engages the corresponding internal threads on the portion 47 of the valve body 38, the pins 52 and 53 are pushed to the bottom of the L-shaped slots 55 by further downward movement of the pipe 11. Rotation of the pipe 11 in a clockwise direction, as viewed from the top in FIG. 7, causes the pins 52 and 53 to engage the slightly concave elbows or bends of the L-shaped slots 55 to permit tightening of the valve member 48 into engagement with the valve seat 50. After this is done, withdrawal of the rod 11 causes the slightly concave bends of the slots 55 to cam the pins 52 and 53 out of engagement, permitting easy removal of the pipe 11 from the open upper ends of the slots 55.

When subsequent opening of the valve is desired, the pipe 11 is reinserted in the position shown in FIG. 7 and is rotated counter clockwise, as viewed looking down into the open end of the supply pipe 10 shown in FIG. 7. This causes the pins 52 and 53 to engage the closed ends of the L-shaped slots 55. The valve poppet 48 then can be rotated to the point where the channels 40 and 41 are unblocked. A slight twist of the pipe 11 in the clockwise direction then places the pins 52 and 53 substantially beneath the open vertical legs of the slots 55 permitting withdrawal of the pipe 11 while leaving the poppet 48 in place within the valve 38.

If complete withdrawal of the poppet 48 is desired, the poppet 48 is rotated in the counter clockwise direction until the threads on it completely disengage the internal threads on the portion 47 of the valve 38. When this has been effected, upward withdrawal of the pipe 11 causes the pins 52 and 53 once again to be seated in the pockets formed by the projections 56; and the poppet 48 is withdrawn through the riser pipe 10 with the pipe 11 and removed.

Subsequently, when utilization of the water supplied by the pipe 10 no longer is necessary or desired, the water again may be removed from the pipe 10 by insertion of the end of the pipe 11 carrying the washer 12 to force the water out of the pipe 10; and the valve poppet 48 is lowered into place by means of the pipe 11 and rotated to seat the gasket 50 against the valve seat 44 to close the valve 38.

It should be noted that if the material out of which the washer 12 is made is such that it is unlikely to require replacement, the pins 52 and 53 can be located below the washer 12 on the same end of the pipe 11. This would permit lowering of the poppet 48 into place simultaneously with removal of the water from the pipe 10. The upper end of the pipe 11 having the hole 18 then could be provided with a permanent handle for effecting rotation of the pipe 11 to close and open the valve 38. Similarly, the collar 28 shown in FIGS. 3 and 6 could be located below the washer 12 of the embodiments disclosed in these Figs. for effecting insertion and removal of the expandable plug 21. If it is desirable to permit easy replacement of the washer 12, the plug or valve operating members carried by the pipe 11 should be located at the opposite end of the pipe 11 from the washer 12, as shown in the drawings.

I claim:

1. In a liquid supply system for supplying liquid from a source to a point of use including in combination:

a liquid supply pipe for connection between a supply of liquid and a point of use, said liquid supply pipe having a predetermined internal diameter;

valve means having a valve body and valve operating member, the body of said valve means coupled to one end of said liquid supply pipe for interconnecting said liquid supply pipe with a source of liquid, said valve operating member having an engagable portion thereon;

a rigid hollow pipe having first and second ends and having an external diameter less than the internal diameter of said liquid supply pipe, and having an internal diameter substantially less than the internal diameter of said supply pipe, with first and second openings being provided in said hollow pipe at said first and second ends thereof;

compression washer means mounted on said hollow pipe near the first end thereof intermediate said first and second openings and having an external diameter sufficient to engage the internal surface of said liquid supply pipe with the first end of said hollow pipe inserted; and the second end of said hollow pipe having engaging means for engaging said engagable portion of said valve operating member to permit operation of said valve operating member by said engaging means.

2. The combination according to claim 1 wherein said compression washer means is a cup-shaped leather compression washer, the open end of which faces the first end of said hollow pipe.

3. The combination according to claim 1 wherein the valve body of said valve means includes a valve seat located for engagement by a valve closing portion on one end of said valve operating member to block the passage of fluid from a source of supply to said liquid supply pipe, and said valve operating member has an open hollow portion at the end thereof remote from said one end, the inner dimensions of said hollow portion being sufficient to permit insertion of the second end of said hollow pipe therein, and wherein one of the engagable portion of said valve operating member and the engaging means on said hollow pipe comprises pin means extending substantially at right angles to the axis of said hollow pipe and the other of said engaging means and said engagable portion comprises a substantially L-shaped slot having dimensions sufficient to accommodate said pin means, the L-shaped slot having an open end and a closed end, with the open end extending substantially parallel to the axis of said hollow pipe.

4. The combination according to claim 3 wherein said pin means comprises first and second diametrically opposed pins on said hollow pipe extending from the outer surface thereof, and said valve operating member has first and second corresponding L-shaped slots formed in the walls of said hollow portion to permit insertion of said first and second pins into the open ends of said first and second L-shaped slots, rotation of said hollow pipe in one direction causing said pins to engage the bends of said L-shaped slots and rotation of said hollow pipe in the opposite direction causing said pins to engage the closed ends of the L-shaped slots.

5. The combination according to claim 4 wherein said valve body is internally threaded and said valve operating member is an externally threaded poppet, so that rotation of said poppet in said one direction causes said operating member to move said valve closing portion into engagement with said valve seat and rotation of said poppet in said opposite direction causes valve closing portion to be rotated out of engagement with said valve seat, thereby opening said valve.

6. The combination according to claim 5 wherein the bends of said L-shaped slots are located to be engaged by said first and second pins with said hollow pipe being rotated in said one direction to tighten said poppet into engagement with said valve seat, said bends being reversely cut out in an amount less than the diameter of said pins to provide a camming surface thereon, so that upon complete closure of said valve, withdrawal of said hollow pipe causes the first and second pins to be cammed out of said bends to permit removal of said hollow pipe, the closed ends of said L-shaped slots being reversely undercut in the direction of said open ends to form pin receiving pockets for said pins to permit insertion and removal of said poppet by said hollow pipe.

7. Apparatus for removing liquids from an open supply pipe having a predetermined internal diameter including in combination:

a hollow pipe with first and second ends having an external diameter less than the internal diameter of the supply pipe and having an internal diameter substantially less than the internal diameter of said supply pipe, said hollow pipe having openings at said first and second ends;

compression washer means mounted on said hollow pipe near the first end thereof and between said openings, said washer means having an external diameter sufficient to engage the internal surface of the supply pipe with said hollow pipe inserted therein.

8. The combination according to claim 7 wherein the supply pipe has a first predetermined length and said hollow pipe has a second predetermined length greater than said first predetermined length, so that upon insertion of the first end of the hollow pipe into the supply pipe, the compression washer means forces liquid in the supply pipe into said hollow pipe through the opening at the first end thereof, with such liquid being discharged through the opening at said second end of said hollow pipe.

9. The combination according to claim 7 wherein said compression washer means comprises a resilient cup-shaped compression washer encircling said hollow pipe and wherein at least the opening at said second end of said hollow pipe comprises a hole formed substantially at right angles to said hollow pipe, with the second end of said hollow pipe being closed.

10. The combination according to claim 9 wherein said compression washer is a leather cup, the open end of which faces the first end of said hollow pipe.

11. The combination according to claim 7 further including pipe closing means for the supply pipe to prevent the passage of liquids therethrough; and means for mounting said pipe closing means on the second end of said hollow pipe, with insertion of the second end of said hollow pipe into the supply pipe placing said pipe closing means within the supply pipe.

12. The combination according to claim 11 wherein said pipe closing means includes an expandable closing member, the expansion of which is controlled by rotating one end thereof and wherein the first end of said hollow pipe includes tool engagement surfaces formed therein for engagement by a tool used to facilitate rotation of said hollow pipe to cause expansion of said expandable closing member.

13. The combination according to claim 12 wherein said expandable closing member and said second end of said hollow pipe include cooperating members permitting rotation of said expandable closing member by said hollow pipe and movement of said expandable closing member into and out of the supply pipe by said hollow pipe.

14. The combination according to claim 13 wherein said cooperating members include at least one pin means mounted substantially at right angles to the axis of said hollow pipe on said pipe closing member or said hollow pipe with the other of said pipe closing member and said hollow pipe having an L-shaped slot therein for accommodating said pin means.

* * * * *